(12) United States Patent  
Xu

(10) Patent No.: US 11,697,419 B2  
(45) Date of Patent: Jul. 11, 2023

(54) VEHICLE SLIP REGULATION METHOD AND APPARATUS, ELECTRONIC DEVICE AND MEDIUM

(71) Applicants: TIANJIN SOTEREA AUTOMOTIVE TECHNOLOGY LIMITED COMPANY, Tianjin (CN); ZHEJIANG SOTEREA TECHNOLOGY GROUP LIMITED COMPANY, Hangzhou (CN)

(72) Inventor: Xianjie Xu, Hangzhou (CN)

(73) Assignees: TIANJIN SOTEREA AUTOMOTIVE TECHNOLOGY LIMITED COMPANY, Tianjin (CN); ZHEJIANG SOTEREA TECHNOLOGY GROUP LIMITED COMPANY, Hangzhou (CN)

( * ) Notice: Subject to any disclaimer, the term of this patent is extended or adjusted under 35 U.S.C. 154(b) by 0 days.

(21) Appl. No.: 17/811,878

(22) Filed: Jul. 12, 2022

(65) Prior Publication Data

US 2022/0348208 A1 Nov. 3, 2022

Related U.S. Application Data

(63) Continuation of application No. PCT/CN2021/124371, filed on Oct. 18, 2021.

(30) Foreign Application Priority Data

Jan. 28, 2021 (CN) .......................... 202110115019.0

(51) Int. Cl.
*B60W 30/18* (2012.01)
*B60W 10/06* (2006.01)

(52) U.S. Cl.
CPC ...... *B60W 30/18172* (2013.01); *B60W 10/06* (2013.01); *B60W 2510/0657* (2013.01); (Continued)

(58) Field of Classification Search
CPC ........... B60W 30/18172; B60W 10/06; B60W 2510/0657; B60W 2510/1005; (Continued)

(56) References Cited

U.S. PATENT DOCUMENTS 5,696,683 A * 12/1997 Schafer .................. B60K 28/16  
    303/142  
6,125,319 A * 9/2000 Hac ...................... B60T 8/17636  
    701/80  
(Continued)

FOREIGN PATENT DOCUMENTS

CN    201646432 A    11/2010  
CN    102267459 A    12/2011  
(Continued)

OTHER PUBLICATIONS

Zhiyuan et al., "Simulation of Acceleration Slip Regulation for vehicle based on CAN bus," 2011, Publisher: IEEE.*  
(Continued)

*Primary Examiner* — Tuan C To  
(74) *Attorney, Agent, or Firm* — True Shepherd LLC; Andrew C. Cheng

(57) ABSTRACT

The present invention relates to the field of vehicles, in particular to a vehicle slip regulation method and apparatus, an electronic device and a medium. The vehicle slip regulation method comprises the following steps: determining a pavement type of a vehicle driving pavement in response to a vehicle acceleration slip regulation event; determining an overall target acceleration of a vehicle according to the determined pavement type, the speed of a non-driving wheel  
(Continued)

and the slip time of a driving wheel; and performing vehicle slip regulation according to the overall target acceleration. The method does not need to determine wheel adhesion coefficient of a vehicle according to coefficients such as vehicle weight and road slope, can perform slip regulation by calculating overall target accelerations under different pavements, and has strong practicability and robustness and good acceleration slip regulation effect.

12 Claims, 10 Drawing Sheets

(52) U.S. Cl.
CPC .............. *B60W 2510/1005* (2013.01); *B60W 2520/105* (2013.01); *B60W 2520/26* (2013.01); *B60W 2520/28* (2013.01); *B60W 2710/0666* (2013.01); *B60W 2720/106* (2013.01)

(58) Field of Classification Search
CPC ....... B60W 2520/105; B60W 2520/26; B60W 2520/28; B60W 2710/0666; B60W 2720/106
USPC .......................................................... 701/82
See application file for complete search history.

(56) References Cited

U.S. PATENT DOCUMENTS

| | | | | |
|---|---|---|---|---|
| 6,321,154 | B1* | 11/2001 | Schmitt | B60W 30/18027 701/84 |
| 6,460,647 | B1* | 10/2002 | Schmitt | B60K 28/16 180/197 |
| 6,755,488 | B2* | 6/2004 | Fawkes | B60W 10/18 303/142 |
| 7,779,947 | B2* | 8/2010 | Stratton | B60W 10/08 180/9.1 |
| 9,387,843 | B2* | 7/2016 | Ziegler | B60K 28/16 |
| 10,029,566 | B2* | 7/2018 | Chimner | B60K 23/04 |
| 11,273,833 | B2* | 3/2022 | Lian | B60W 30/18172 |
| 11,279,239 | B2* | 3/2022 | Watanabe | B60W 50/0097 |
| 2004/0117101 | A1* | 6/2004 | Maier-Landgrebe | B60W 10/08 701/84 |
| 2005/0107215 | A1* | 5/2005 | Werner | B60W 10/02 477/174 |
| 2016/0318501 | A1* | 11/2016 | Oldridge | B60W 20/12 |
| 2016/0375907 | A1* | 12/2016 | Erban | B60W 20/12 701/99 |
| 2017/0066447 | A1* | 3/2017 | Hertel | B60W 10/02 |
| 2018/0170330 | A1 | 6/2018 | Wieder et al. | |
| 2018/0326989 | A1 | 11/2018 | Foster et al. | |
| 2019/0276023 | A1* | 9/2019 | Kikuchi | B60W 10/119 |
| 2020/0086877 | A1* | 3/2020 | Zhang | B60L 3/102 |

FOREIGN PATENT DOCUMENTS

| | | | | |
|---|---|---|---|---|
| CN | 108928261 | A | 12/2018 | |
| CN | 109606369 | A | 4/2019 | |
| CN | 109927704 | A | 6/2019 | |
| CN | 110884363 | A | 3/2020 | |
| CN | 111801257 | A | 10/2020 | |
| CN | 112455447 | A | 3/2021 | |
| EP | 2409886 | A2 * | 1/2012 | ............ B60T 8/1706 |
| GB | 2390651 | A * | 1/2004 | ............ B60T 8/175 |
| JP | 2002337677 | A | 11/2002 | |
| JP | 2018076010 | A | 5/2018 | |
| KR | 20190104476 | A | 9/2019 | |
| WO | WO-2009128815 | A1 * | 10/2009 | ............ B60L 15/20 |

OTHER PUBLICATIONS

Li Junwei et al., "Research on Acceleration Slip Regulation System for Two Wheel Drive Electric Vehicle," 2009, Publisher: IEEE.*
Internation Search Report of PCT/CN2021/124371, dated Jan. 11, 2022.

* cited by examiner

VEHICLE SLIP REGULATION METHOD AND APPARATUS, ELECTRONIC DEVICE AND MEDIUM

CROSS-REFERENCE TO RELATED APPLICATIONS

This application is a continuation of International Patent Application No. PCT/CN2021/124371 with a filing date of Oct. 18, 2021, designating the United States, now pending, and further claims priority to Chinese Patent Application No. 202110115019.0 with a filing date of Jan. 28, 2021. The content of the aforementioned applications, including any intervening amendments thereto, are incorporated herein by reference.

TECHNICAL FIELD

The present invention relates to the field of vehicles, in particular to a vehicle slip regulation method and apparatus, an electronic device and a medium.

DESCRIPTION OF RELATED ART

Acceleration Slip Regulation (ASR) is one of the key technologies of vehicle active safety. Under extremely bad road conditions such as ice-snow covered pavements and bisectional ice-snow and asphalt adhered pavements, the maximum driving torque that can be provided to driving wheels by the road conditions is less than the driving torque actually acting on the driving wheels, resulting in excessive slip of the driving wheels. When the slip rate of a vehicle exceeds 20%, the longitudinal adhesion coefficient of the vehicle decreases, while the lateral adhesion coefficient decreases sharply, resulting in insufficient vehicle power, loss of lateral stability, and even heavy loss of life and properties in serious cases.

At present, in vehicle slip regulation methods, different strategies are used for uniform adhesion pavements (pavements that provide the left driving wheel and right driving wheel of a vehicle with substantially the same adhesion force) and bisectional adhesion pavements (pavements that provide the left driving wheel and right driving wheel of a vehicle with obviously different adhesion forces). In the regulation strategies for different types of pavements, corresponding slip regulation needs to be carried out according to the target regulation torque of an engine.

However, the current target regulation torque of the engine is determined by comparing the torque that the engine needs to provide with the driver's desired torque (obtained according to the opening of an accelerator pedal) (taking the smaller value of the two). The torque that the engine needs to provide is obtained from the maximum driving force provided to the driving wheels by the ground according to the wheel adhesion coefficient and axle load, wherein the wheel adhesion coefficient will be affected by coefficients such as total vehicle weight and road slope. A large number of test calibrations are required for different vehicle wheel adhesion coefficients of different vehicles, so the practicability and robustness are poor.

In view of that, the present invention is specially provided.

SUMMARY

The embodiments of the present invention provide a vehicle slip regulation method and apparatus, an electronic device and a medium, to improve practicability, robustness and effect of slip regulation.

In order to achieve the above objective, the present invention adopts the following technical solutions:

In a first aspect, the present invention provides a vehicle slip regulation method, including the following steps:
determining a pavement type of a vehicle driving pavement in response to a vehicle acceleration slip regulation event;
determining an overall target acceleration of a vehicle according to the determined pavement type, the speed of a non-driving wheel and the slip time of a driving wheel; and
performing vehicle slip regulation according to the overall target acceleration.

The performing vehicle slip regulation according to the overall target acceleration includes:
calculating a based engine torque according to the overall target acceleration;
calculating an adjustment engine torque according to the based engine torque;
calculating a target regulation torque of a vehicle engine according to the based engine torque and the adjustment engine torque; and
performing vehicle slip regulation according to the target regulation torque.

As a further preferred technical solution, the determining an overall target acceleration of a vehicle according to the determined pavement type, the speed of a non-driving wheel and the slip time of a driving wheel includes:
if the pavement type is a uniform adhesion pavement, determining the overall target acceleration under the uniform adhesion pavement according to the speed of the non-driving wheel and the slip time of the driving wheel; or
if the pavement type is a bisectional adhesion pavement, determining the overall target acceleration under the bisectional adhesion pavement according to the speed of the non-driving wheel, the slip time of the driving wheel on a high adhesion side, and the slip time of the driving wheel on a low adhesion side.

The driving wheel on the low adhesion side and the driving wheel on the high adhesion side are determined according to the slip amounts of driving wheels on different sides.

As a further preferred technical solution, the determining the overall target acceleration under the bisectional adhesion pavement according to the speed of the non-driving wheel, the slip time of the driving wheel on a high adhesion side and the slip time of the driving wheel on a low adhesion side includes:
determining, according to the speed of the non-driving wheel and the slip time of the driving wheel on the high adhesion side, a first acceleration of the non-driving wheel of the vehicle when the driving wheel on the high adhesion side is slipping;
determining, according to the speed of the non-driving wheel and the slip time of the driving wheel on the low adhesion side, a second acceleration of the non-driving wheel of the vehicle when the driving wheel on the low adhesion side is slipping;
calculating double difference between the first acceleration and the second acceleration, to obtain the overall target acceleration under the bisectional adhesion pavement.

As a further preferred technical solution, the calculating a based engine torque according to the overall target acceleration includes:
determining the based engine torque according to the vehicle weight, overall target acceleration, transmission ratio, final drive ratio, and powertrain mechanical efficiency.

As a further preferred technical solution, the based engine torque is determined according to following formula:

$T_{BasedEngTorq}(ma_t \times r)/(i_g \times i_0 \times \eta)$; $T_{BasedEngTorq}$ is the based engine torque, m is the vehicle weight, at is the overall target acceleration, r is the radius of the driving wheel, $i_g$ is the transmission ratio, $i_0$ is the final drive ratio, and $\eta$ is the powertrain mechanical efficiency.

As a further preferred technical solution, the calculating an adjustment engine torque according to the based engine torque includes:

calculating an initial adjustment engine torque according to an initial adjustment engine torque increase;

If the initial adjustment engine torque is greater than a first proportion of based engine torque, determining that the adjustment engine torque is the first proportion of based engine torque;

If the initial adjustment engine torque is between a second proportion of based engine torque and the first proportion of based engine torque, determining that the adjustment engine torque is the initial adjustment engine torque; or If the initial adjustment engine torque is less than the second proportion of based engine torque, determining that the adjustment engine torque is the second proportion of based engine torque.

As a further preferred technical solution, if the pavement type is the uniform adhesion pavement and the vehicle includes a left driving wheel and a right driving wheel, the performing vehicle slip regulation according to the target regulation torque includes:

reducing the engine torque to the target regulation torque, and determining whether the left driving wheel slips and whether the right driving wheel slips after the time difference between the start time of reducing the engine torque and the current time exceeds a first slip time threshold;

If the left driving wheel does not slip and the right driving wheel also does not slip, regulating the engine to maintain the target regulation torque;

If the left driving wheel slips, the right driving wheel does not slip and the slip amount of the left driving wheel exceeds a first slip amount threshold, regulating the left driving wheel to brake;

If the right driving wheel slips, the left driving wheel does not slip and the slip amount of the right driving wheel exceeds the first slip amount threshold, regulating the right driving wheel to brake;

If the slip time of the left driving wheel and the slip time of the right driving wheel both exceed a second slip time threshold, regulating the left driving wheel and the right driving wheel to brake.

As a further preferred technical solution, if the pavement type is the bisectional adhesion pavement, the performing vehicle slip regulation according to the target regulation torque includes:

reducing the engine torque to the target regulation torque, to regulate the driving wheel on the low adhesion side to brake; If the driving wheel on the low adhesion side does not slip within a first time cycle, reducing the braking pressure of the driving wheel on the low adhesion side;

If the driving wheel on the low adhesion side slips after the braking pressure is reduced, increasing the braking pressure of the driving wheel on the low adhesion side; Or if the driving wheel on the low adhesion side does not slip after the braking pressure is reduced, reducing the braking pressure of the driving wheel on the low adhesion side again.

As a further preferred technical solution, if the vehicle includes a left driving wheel and a right driving wheel, the determining a pavement type of a vehicle driving pavement includes:

If the difference between S1 and S2 is greater than a first value, S1>S2 and S2 is less than a second value, determining that the pavement type is a bisectional adhesion pavement having low adhesion on the left driving wheel side or a bisectional adhesion pavement having high adhesion on the right driving wheel side;

If the difference between S2 and S1 is greater than the first value, S2>S1 and S1 is less than the second value, determining that the pavement type is a bisectional adhesion pavement having low adhesion on the right driving wheel side or a bisectional adhesion pavement having high adhesion on the left driving wheel side;

If the absolute value of the difference between S1 and S2 is less than or equal to the first value, determining that the pavement type is a uniform adhesion pavement.

S1 is the slip amount of the left driving wheel, S2 is the slip amount of the right driving wheel, and the first value is greater than the second value.

As a further preferred technical solution, the slip amount of the left driving wheel is obtained in the following way:

calculating the difference between the speed of the left driving wheel and the speed of the non-driving wheel;

determining an accumulated slip amount of the left driving wheel of the vehicle according to the calculated difference and a target time to be determined; Taking the accumulated slip amount as the slip amount S1 of the left driving wheel.

In a second aspect, the present invention provides a vehicle slip regulation apparatus, including:

a pavement type determination module, configured to determine a pavement type of a vehicle driving pavement in response to a vehicle acceleration slip regulation event;

an overall target acceleration determination module, configured to determine an overall target acceleration of a vehicle according to the determined pavement type, the speed of a non-driving wheel and the slip time of a driving wheel; If the pavement type is a uniform adhesion pavement, determining the overall target acceleration under the uniform adhesion pavement according to the speed of the non-driving wheel and the slip time of the driving wheel; If the pavement type is a bisectional adhesion pavement, determining the overall target acceleration under the bisectional adhesion pavement according to the speed of the non-driving wheel, the slip time of the driving wheel on a high adhesion side and the slip time of the driving wheel on a low adhesion side; The driving wheel on the low adhesion side and the driving wheel on the high adhesion side are determined according to the slip amounts of driving wheels on different sides; and a slip regulation module, configured to perform vehicle slip regulation according to the overall target acceleration.

In a third aspect, the present invention provides an electronic device, including:

at least one processor; and a memory connected to the at least one processor by communication.

The memory stores instructions executable by the at least one processor, and the instructions are executed by the at least one processor, so that the at least one processor can execute the above-mentioned vehicle slip regulation method.

In a fourth aspect, the present invention provides a medium, the medium stores computer instructions, and the computer instructions are used to cause a computer to execute the above-mentioned vehicle slip regulation method.

Compared with the prior art, the beneficial effects of the present invention are as follows:

According to the vehicle slip regulation method provided by the present invention, the overall target acceleration of the vehicle is determined according to the pavement type, the speed of the non-driving wheel and the slip time of the driving wheel, and then vehicle slip regulation is performed according to the overall target acceleration. The method only needs to collect the speed of the non-driving wheel and the slip time of the driving wheel for vehicle slip regulation, is not affected by parameters such as vehicle weight and road slope, and does not need to identify complex road coefficients, so the method has strong practicability and robustness, can be directly used in various non-full-drive vehicles, and can achieve a good slip regulation effect without a lot of experimental calibration.

BRIEF DESCRIPTION OF THE DRAWINGS

In order to illustrate the specific embodiments of the present invention or the technical solutions in the prior art more clearly, the accompanying drawings that need to be used in the description of the specific embodiments or the prior art will be briefly introduced below. Apparently, the drawings in the following description show only some embodiments of the present invention, and those of ordinary skill in the art can still derive other drawings from these drawings without any creative effort.

Signs: 201—pavement type determination module; 202—overall target acceleration determination module; 203—slip regulation module; 301—processor; 302—memory; 303—input apparatus; 304—output apparatus.

DESCRIPTION OF THE EMBODIMENTS

Exemplary embodiments of the present application are described below with reference to the accompanying drawings, including various details of the embodiments of the present application to facilitate understanding. The embodiments should be considered as exemplary only. Accordingly, those of ordinary skill in the art should recognize that various changes and modifications can be made to the embodiments described herein without departing from the scope and spirit of the present application. Also, descriptions of well-known functions and constructions are omitted from the following description for clarity and conciseness.

Figure 1:
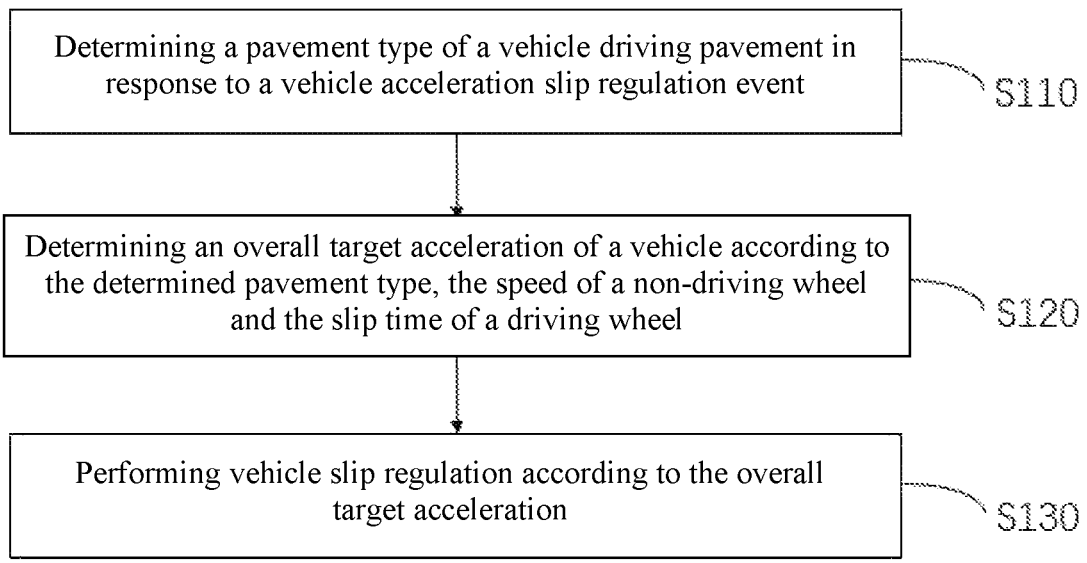
FIG. 1 is a flowchart of a vehicle slip regulation method provided by an embodiment of the present invention.

FIG. 1 is a flowchart of a vehicle slip regulation method provided by an embodiment of the present invention. This embodiment is applicable to the case where slip regulation is performed on a vehicle when wheels slip during the driving of the vehicle. The method may be executed by a vehicle slip regulation apparatus which may be constituted by software and/or hardware and generally integrated in an electronic device.

As shown in FIG. 1, this embodiment provides a vehicle slip regulation method. The method includes the following steps.

S110: Determining a pavement type of a vehicle driving pavement in response to a vehicle acceleration slip regulation event.

The method of this embodiment is performed in response to the vehicle acceleration slip regulation event, and then determines the pavement type of the vehicle driving pavement. The pavement type refers to the type of a pavement. The pavement type may be set according to actual needs. Typically, the pavement type includes uniform adhesion pavements and bisectional adhesion pavements.

In this embodiment, the acquisition of the vehicle acceleration slip regulation event is not particularly limited, and what can be realized in the art may be implemented. For example, the acquisition may be implemented as follows: for a non-all-wheel drive vehicle, the speed of a non-driving wheel can better reflect the actual vehicle speed, and when the difference between the speed of a driving wheel and the average speed of the non-driving wheel is greater than a threshold for a period of time, the vehicle acceleration slip regulation function is triggered to enter acceleration slip regulation. The threshold is set as a constant at low speeds, and a linear function of speed at medium and high speeds.

Specifically, if the vehicle includes a left driving wheel and a right driving wheel, the pavement type is determined in the following way.

When the difference between S1 and S2 is greater than a first value, it is determined that the pavement is a bisectional adhesion pavement having low adhesion on the left driving wheel side or a bisectional adhesion pavement having high adhesion on the right driving wheel side.

When the difference between S2 and S1 is greater than the first value, it is determined that the pavement is a bisectional adhesion pavement having low adhesion on the right driving wheel side or a bisectional adhesion pavement having high adhesion on the left driving wheel side.

When the absolute value of the difference between S1 and S2 is less than or equal to the first value, it is determined that the pavement is a uniform adhesion pavement.

S1 is the slip amount of the left driving wheel, S2 is the slip amount of the right driving wheel, and the first value is greater than a second value. S1 is determined according to the speed of the left driving wheel and a target time, and is an instantaneous slip amount. S2 is determined according to the speed of the right driving wheel and the target time, and is an instantaneous slip amount.

The above determination method has the problem of inaccurate determination on the pavement type. In order to improve the accuracy of determination, preferably, if the vehicle includes a left driving wheel and a right driving wheel, the pavement type is determined in the following way.

When the difference between S1 and S2 is greater than the first value, S1>S2 and S2 is less than the second value, it is determined that the pavement is a bisectional adhesion pavement having low adhesion on a left driving wheel side or a bisectional adhesion pavement having high adhesion on a right driving wheel side.

When the difference between S2 and S1 is greater than the first value, S2>S1 and S1 is less than the second value, it is determined that the pavement is a bisectional adhesion pavement having low adhesion on the right driving wheel side or a bisectional adhesion pavement having high adhesion on the left driving wheel side.

When the absolute value of the difference between S1 and S2 is less than or equal to the first value, it is determined that the pavement is a uniform adhesion pavement.

S1 is the slip amount of the left driving wheel, S2 is the slip amount of the right driving wheel, and the first value is greater than the second value.

The low adhesion on the left driving wheel side refers to that the adhesion force of the left driving wheel is less than that of the right driving wheel when the slip amount of the left driving wheel of the vehicle is greater than the slip amount of the right driving wheel.

The high adhesion on the right driving wheel side refers to that the adhesion force of the right driving wheel is greater than that of the left driving wheel when the slip amount of the left driving wheel of the vehicle is greater than the slip amount of the right driving wheel.

The slip amount of the left driving wheel refers to the distance of slip of the left driving wheel when the vehicle slips.

The slip amount of the right driving wheel refers to the distance of slip of the right driving wheel when the vehicle slips.

In the prior art, the determination by comparing whether the difference between S1 and S2 is greater than the first value is inaccurate. In this preferred way, when it is determined that the pavement type is a bisectional adhesion pavement, whether the difference between S1 and S2 is greater than the first value is determined and combined with the magnitude of S1 or S2. Only when S1 or S2 is less than the second value, the high adhesion side and the low adhesion side to the bisectional adhesion pavement can be determined accurately and reliably.

Optionally, the slip amount of the left driving wheel is obtained according to the speed of the left driving wheel and the average speed of the non-driving wheel, and the obtained slip amount is an instantaneous slip amount (i.e. a slip amount at a certain moment). In order to improve the accuracy of the obtained slip amount, the slip amount of the left driving wheel is preferably obtained in the following way:

calculating the difference between the speed of the left driving wheel and the average speed of the non-driving wheel;

determining an accumulated slip amount of the left driving wheel of the vehicle according to the calculated difference and a target time to be determined; Using the accumulated slip amount as the slip amount of the left driving wheel.

Specifically, determining an accumulated slip amount of the left driving wheel of the vehicle according to the calculated difference and a target time to be determined includes: calculating an integral of the difference over the target time to be determined to obtain the accumulated slip amount of the left driving wheel of the vehicle.

The slip amount of the right driving wheel is obtained in the following way:

calculating the difference between the speed of the right driving wheel and the average speed of the non-driving wheel;

determining an accumulated slip amount of the right driving wheel of the vehicle according to the calculated difference and a target time to be determined; Using the accumulated slip amount as the slip amount of the right driving wheel.

The actual acceleration slip regulation process involves complex vehicle conditions and road conditions, it is difficult to perform real-time identification of adhesion, and there are often large errors, which will cause misjudgment of pavement conditions, affect the actual acceleration slip regulation effect and even cause major safety hazards in serious cases. The slip of the left and right driving wheels within a certain time can quickly and accurately reflect road conditions. In this preferred way, the calculated accumulated slip amount is used as the slip amount of the corresponding driving wheel. The accumulated slip amount of the left driving wheel of the vehicle and the accumulated slip amount of the right driving wheel of the vehicle are preferably calculated by respectively calculating the integral of the difference between the speed of the left driving wheel and the average speed of the non-driving wheel over time, and the integral of the difference between the speed of the right driving wheel and the average speed of the non-driving wheel over time, and the integral attenuates at a rate of 15% per cycle to prevent excessive integral of the difference between the speed of the driving wheel and the speed of the non-driving wheel, and then are expressed as S1 and S2 after unit conversion. Of course, only the integral of the difference between corresponding speeds over time may be calculated, without speed attenuation and unit conversion.

Preferably, the slip amount of the left driving wheel is calculated by the following formula: $S1=0.85 \times 0.01 \times \int (V_{drive\_L} - \frac{1}{2} \times (V_{non-drive\_L} + V_{non-drive\_R})) dt$ $V_{drive\_L}$ is the speed of the left driving wheel, $V_{non-drive\_L}$ is the speed of the left non-driving wheel, and $V_{non-drive\_R}$ is the speed of the right non-driving wheel.

Preferably, the slip amount of the right driving wheel is calculated by the following formula:

$$S2 = 0.85 \times 0.01 \times \int (V_{drive\_R} - \frac{1}{2} \times (V_{non-drive\_L} + V_{non-drive\_R})) dt;$$

$V_{drive\_R}$ is the speed of the right driving wheel, $V_{non-drive\_L}$ is the speed of the left non-driving wheel, and $V_{non-drive\_R}$ is the speed of the right non-driving wheel.

After the above formulas for calculating the slip amount of the left driving wheel and the slip amount of the right driving wheel are used, the inventor found that when the first value is 3 and the second value is 2, the determined pavement type is more accurate.

S120: Determining an overall target acceleration of a vehicle according to the determined pavement type, the speed of a non-driving wheel and the slip time of a driving wheel.

The speed of a non-driving wheel refers to the speed of the non-driving wheel of the vehicle, the non-driving wheel refers to other wheels except driving wheels of the vehicle, and the wheel speed refers to the rotational speed of wheels in m/s.

The slip time of a driving wheel refers to the time when the driving wheel of the vehicle slips.

The overall target acceleration refers to the acceleration that the vehicle needs to be regulated to reach or achieve.

Optionally, the determining an overall target acceleration of a vehicle according to the determined pavement type, the speed of a non-driving wheel and the slip time of a driving wheel includes:

If the pavement type is a uniform adhesion pavement, determining the overall target acceleration under the uniform adhesion pavement according to the speed of the non-driving wheel and the slip time of the driving wheel; or If the pavement type is a bisectional adhesion pavement, determining the overall target acceleration under the bisectional adhesion pavement according to the speed of the non-driving wheel and the slip time of the driving wheel on a low adhesion side.

The slip time of the driving wheel on the low adhesion side refers to the time when the driving wheel with a large slip amount slips. In the above method, the slip time of the driving wheel on the low adhesion side is used to determine the overall target acceleration under the bisectional adhesion pavement, which can suppress the slip of two driving wheels to the greatest extent. However, the slip amount on the high adhesion side itself is relatively small, so in actual regulation, when the low adhesion side stops slipping, the high adhesion side has already stopped slipping. Therefore, the method has a certain degree of torque waste.

Preferably, the determining an overall target acceleration of a vehicle according to the determined pavement type, the speed of a non-driving wheel and the slip time of a driving wheel includes:

If the pavement type is a uniform adhesion pavement, determining the overall target acceleration under the uniform adhesion pavement according to the speed of the non-driving wheel and the slip time of the driving wheel; or If the pavement type is a bisectional adhesion pavement, determining the overall target acceleration under the bisectional adhesion pavement according to the speed of the non-driving wheel, the slip time of the driving wheel on a high adhesion side and the slip time of the driving wheel on a low adhesion side.

The driving wheel on the low adhesion side and the driving wheel on the high adhesion side are determined according to the slip amounts of driving wheels on different sides. Comparing the slip amount of the left driving wheel with the slip amount of the right driving wheel, the driving wheel on the side with a larger slip amount is the driving wheel on the low adhesion side, and the driving wheel on the side with a smaller slip amount is the driving wheel on the high adhesion side.

On the uniform adhesion pavement, the adhesion difference on both sides of the driving wheel can be neglected, and the adhesions of driving wheels on two sides can be regarded as consistent. When the two driving wheels slip greatly, the two driving wheels make full use of ground adhesion, the average speed acceleration a1 of the non-driving wheel during this cycle is calculated, and the acceleration can be regarded as the overall target acceleration $a_{t1}$ on the uniform adhesion pavement. Preferably, the calculation formula of the overall target acceleration under the uniform adhesion pavement is: $a_{t1}=a1=du/d_{t1}$; $a_{t1}$ is the overall target acceleration under the uniform adhesion pavement in m/s², a1 is the acceleration of the average speed of the non-driving wheel when the driving wheel is slipping on the uniform adhesion pavement in m/s², u is the average speed of the non-driving wheel in m/s, and $t_1$ is the slip time of the driving wheel in s.

The differential distributes a driving torque uniformly to the left and right driving wheels, so on the bisectional pavement, the driving force provided by the ground to the driving wheel on the high adhesion side is much greater than that on the low adhesion side, and the overall target acceleration at this time is slightly different from the overall target acceleration on uniform adhesion. Only when the low adhesion side and the high adhesion side fully use pavement adhesion, the acceleration of the non-driving wheel can be regarded as the target acceleration.

On the bisectional adhesion pavement, the low adhesion side is more likely to slip, and the driving wheel on the low adhesion side slips first when the driving torque is increased. At this time, the adhesion on the low adhesion side is fully used, while the adhesion on the high adhesion side has not yet reached its limit, and the acceleration a2 of the average speed of the non-driving wheel during the cycle of slip on the low adhesion side is calculated.

In order to fully use of the adhesion on the high adhesion side, the target regulation torque of the engine is rapidly increased after the slip of the driving wheel on the low adhesion side is suppressed to a certain extent, certain braking pressure is applied to the low adhesion side, then the adhesion on the high adhesion side is fully used, while the speed of the driving wheel on the low adhesion side is maintained near the average speed of the non-driving wheel under the combined action of the driving torque and braking torque, and the acceleration a3 of the average speed of the non-driving wheel during the cycle of slip on the high adhesion side is calculated.

Preferably, the calculation formula of the overall target acceleration under the bisectional adhesion pavement is: $a_{t2}=2\times a3-a2$, $a2=du/dt_2$, and $a3=du/dt_3$, where $a_{t2}$ is the overall target acceleration under the bisectional adhesion pavement (m/s²), a2 is the acceleration of the average speed of the non-driving wheel when the driving wheel on the low adhesion side slips on the bisectional adhesion pavement (m/s²), u is the average speed of the non-driving wheel (m/s), $t_2$ is the slip time of the driving wheel on the low adhesion side on the bisectional adhesion pavement (s), a3 is the acceleration of the average speed of the non-driving wheel when the driving wheel on the high adhesion side slips on the bisectional adhesion pavement (m/s²), and t3 is the slip time of the driving wheel on the high adhesion side on the bisectional adhesion pavement (s).

S130: Performing vehicle slip regulation according to the overall target acceleration.

When the slip regulation is performed on the vehicle, the pavement type should be comprehensively considered. For the uniform adhesion pavement, there may be three different regulation situations: 1, when the driving wheels slip during general adhesion, the speeds of the driving wheels on two sides quickly converge near the speeds of non-driving wheels by reducing engine torque regulation; 2, when the driving wheels slip during general adhesion, the speed of the driving wheel on one side quickly converges near the speed of the non-driving wheel by reducing engine torque regulation, while the driving wheel on the other side still slips greatly, and certain braking control needs to be applied to the side with larger slip; and 3, when the driving wheels slip under low adhesion conditions, the speeds of the driving wheels cannot quickly converge near the speeds of non-driving wheels by simply reducing engine torque regulation, but certain additional braking pressure is required to achieve this purpose. For the bisectional adhesion pavement, in order to fully use of the adhesion on the high adhesion side, the driving torque should be as close as possible to the maximum driving force that can be provided by the pavement on the high adhesion side within the range that the driving torque does not exceed the torque required by the driver, so as to fully use the adhesion on this side to improve vehicle power; However, slip inevitably occurs on the low adhesion side at this time. Therefore, certain braking pressure is applied to this side to increase the load, thereby suppressing the slip of the driving wheel on the low adhesion side and ensuring vehicle stability.

For the engine torque regulation, only the target regulation torque of the engine needs to be calculated and sent to the engine management to realize the target regulation torque. The target regulation torque includes feedforward control and feedback control. The feedforward control calculates the average acceleration at the initial stage of slip of the driving wheel. At this time, it can be considered that the driving torque acting on the driving wheel has reached a maximum value, and the average acceleration can be regarded as a maximum acceleration that the vehicle can achieve under such road condition. The total weight of the vehicle can be estimated in real time according to the longitudinal kinetic equation of the vehicle, and the feedforward torque value can be calculated. This method is different from the traditional method of calculating, according to the estimated adhesions of driving wheels on two sides, the maximum driving force of a vehicle under the pavement condition. This method is convenient to implement, does not depend on identified road conditions and other parameters of the vehicle, and can easily calculate the maximum driving torque under any circumstances. This torque is referred to as a based engine torque. The feedback control plays a role of adjusting the based engine torque. The increase in torque is determined by logic threshold control according to the speed difference between the driving wheel and the non-driving wheel, the acceleration of the speed of the driving wheel, and threshold values such as time threshold. The increased torque after integration is added to the based engine torque. Accordingly, the calculation of the engine torque is realized, and the speed of the driving wheel converges near the speed of the non-driving wheel, thereby ensuring the longitudinal dynamic performance of the vehicle and achieving better lateral stability. This torque is referred to as an adjustment engine torque.

For braking pressure control, corresponding ASR valve and ABS valve instructions are sent, and valves act in response to the sent instructions, so as to increase, maintain and reduce the braking pressure of each wheel.

Figure 2:
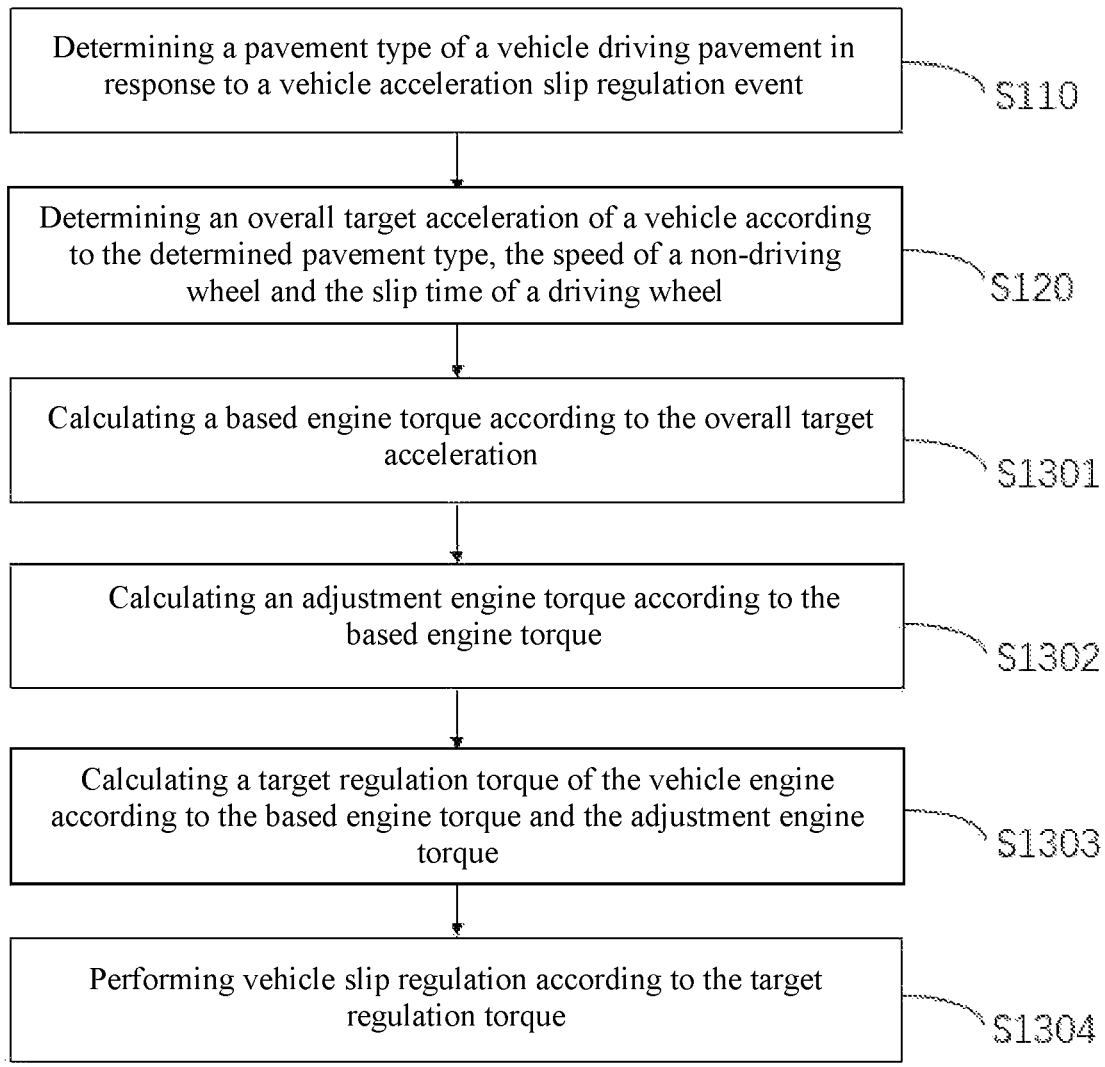
FIG. 2 is a flowchart of another vehicle slip regulation method provided by an embodiment of the present invention.
Figure 3:
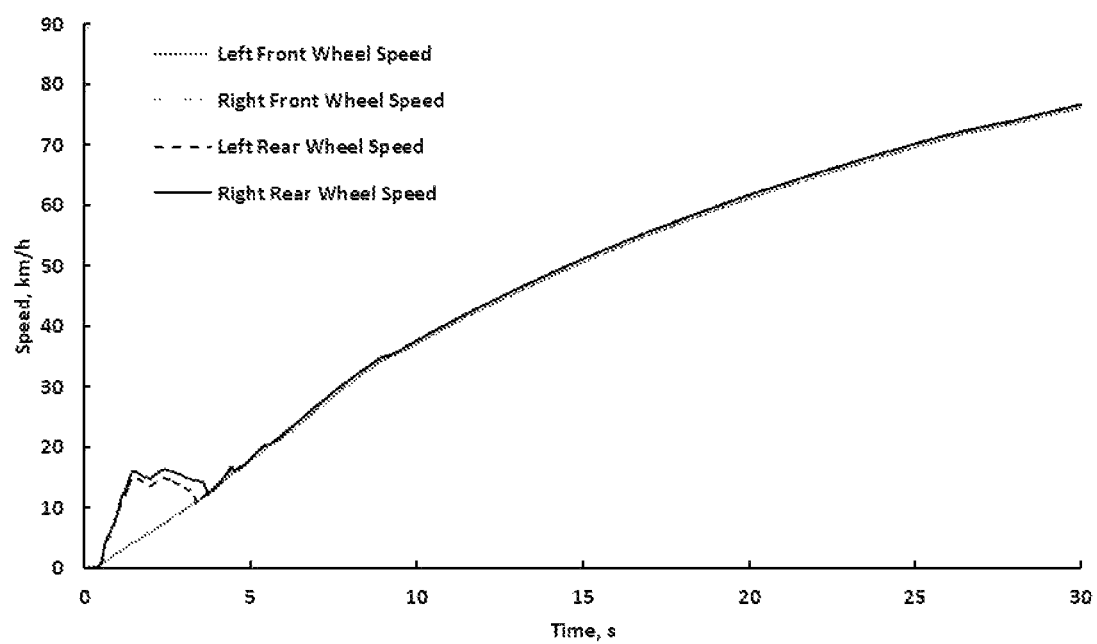
FIG. 3 is a schematic illustration of speeds of wheels under a uniform adhesion pavement.

Therefore, preferably, as shown in FIG. 2, the performing vehicle slip regulation according to the overall target acceleration includes:

S1301: Calculating a based engine torque according to the overall target acceleration.

Specifically, the calculating a based engine torque according to the overall target acceleration includes: determining the based engine torque according to the vehicle weight, overall target acceleration, transmission ratio, final drive ratio, and powertrain mechanical efficiency.

The calculation formula of the based engine torque is preferably $$T_{BasedEngTorq} = \frac{F_t \times r}{i_g \times i_0 \times \eta},$$

$F_t = ma_t$; $T_{BasedEngTorq}$ is the based engine torque, r is the radius of the driving wheel, $i_g$ is the transmission ratio, $i_0$ is the final drive ratio, is the powertrain mechanical efficiency, $F_t$ is the driving force, m is the vehicle weight, and $a_t$ is the overall target acceleration.

The $F_t = ma_t$ is obtained according to the longitudinal kinetic formula of the vehicle: $ma_t = Ft - Fi - Fw - Fj$; m is the vehicle weight, and $a_t$ is overall target acceleration, Ft is the driving force, Fi is slope resistance, Fw is wind resistance, Fj is acceleration resistance, the influence of a slope can be ignored, and Fi is 0. The acceleration slip regulation can be triggered basically at low speed and low gear, and the air resistance is directly proportional to the square of the speed. In this case, the air resistance is relatively small, and Fw is approximately 0. Fj is small relative to Ft and can be ignored. The driving force on the driving wheel can be calculated according to the obtained overall target acceleration while the slope resistance and wind resistance are ignored, and then the based engine torque $T_{BasedEngTorq}$ (as described above) can be solved according to the characteristics of a powertrain S1302: Calculating an adjustment engine torque according to the based engine torque.

Specifically, calculating an adjustment engine torque according to the based engine torque includes:

calculating an initial adjustment engine torque according to an initial adjustment engine torque increase;

If the initial adjustment engine torque is greater than a first proportion of based engine torque, determining that the adjustment engine torque is the first proportion of based engine torque;

If the initial adjustment engine torque is between a second proportion of based engine torque and the first proportion of based engine torque, determining that the adjustment engine torque is the initial adjustment engine torque; or If the initial adjustment engine torque is less than the second proportion of based engine torque, determining that the adjustment engine torque is the second proportion of based engine torque.

The initial adjustment engine torque increase refers to an initial adjustment value for adjusting the increase in the based engine torque, and can be determined according to the slip amount of the driving wheel, the acceleration of the driving wheel, and a time threshold value.

The initial adjustment engine torque refers to an initial adjustment value for adjusting the deviation of the based engine torque, and can be obtained by calculating an integral of the adjustment engine torque increase over time.

The based engine torque refers to an engine torque required to regulate the vehicle to achieve overall target acceleration.

The first proportion is greater than the second proportion. Generally, the first proportion is a positive number, and the second proportion is a negative number. The first proportion and the second proportion are determined according to the weight of the adjustment engine torque in the target engine torque.

Due to some reasons such as weight estimation error and inaccurate calculation of target acceleration, the based engine torque fluctuates over an expected engine torque, causing slip of the driving wheel or affecting the power performance of the vehicle. The adjustment engine torque is to adjust the deviation of the based engine torque to better improve the performance of the vehicle. If the driving wheel is still slipping under the action of the based engine torque, the slip of the driving wheel can be suppressed by reducing the adjustment engine torque to be negative. If the driving wheel is not slipping, the adjustment engine torque can be slightly increased to further improve the power of the vehicle. The initial adjustment engine torque is determined according to a logic threshold control method, and the initial adjustment engine torque increase is determined according to the slip amount of the driving wheel, the acceleration of the driving wheel, and thresholds such as time threshold. When the slip amount of the driving wheel is large, the initial adjustment engine torque increase is negative, so reducing the driving torque can prevent the driving wheel from slipping. On the contrary, when the slip amount of the driving wheel is small, the initial adjustment engine torque increase is small; When the acceleration of the wheel is large, the initial adjustment engine torque increase is small, and when the acceleration of the wheel is small, the initial adjustment engine torque is large. If the wheel never slips or the slip has not been eliminated within a certain time, the initial adjustment engine torque increase is further increased or reduced to increase the power of the vehicle or quickly suppress the slip of the driving wheel.

The initial adjustment engine torque is an integral of the adjustment engine torque increase:

$$T_{EngTorqAdjust1} = \int T_{EngTorqAdjustSpd} dt$$

$T_{EngTorqAdjust1}$ is the initial adjustment engine torque in N·m, and the $T_{EngTorqAdjustSpd}$ is the initial adjustment engine torque increase in N·m/s.

According to the meanings of the based engine torque and the adjustment engine torque, the based engine torque is a base value that the vehicle is adhered to the current road, so that the driving wheel make full use of pavement adhesion to improve power performance. The adjustment engine torque is to compensate for the error of the based engine torque. When the based torque is too large, the slip of the driving wheel is suppressed by reducing the adjustment engine torque, and when the based torque is too small, the power performance of the whole vehicle is further improved by increasing the adjustment engine torque. The target regulation torque of the engine should be dominated by the based engine torque, and the adjustment engine torque plays a supporting role, so the adjustment engine torque is limited within the range of +/−40% of the based engine torque.

teracted, resulting in large energy waste, large wheel acceleration jitter, and poor driver's subjective experience. Based on the above problems, this embodiment preferably adopts the following methods for slip regulation:

(a) If the pavement type is a uniform adhesion pavement, the performing vehicle slip regulation according to the target regulation torque includes reducing the engine torque to the target regulation torque, and determining whether the left driving wheel and the right driving wheel slip after the time difference between the start time of reducing the engine torque and the current time exceeds a first slip time threshold;

If the left driving wheel and the right driving wheel do not slip, regulating the engine to maintain the target regulation torque;

If the left driving wheel slips, the right driving wheel does not slip and the slip amount of the left driving wheel exceeds a first slip amount threshold, regulating the left driving wheel to brake;

If the right driving wheel slips, the left driving wheel does not slip and the slip amount of the right driving wheel exceeds the first slip amount threshold, regulating the right driving wheel to brake; or If the slip time of the left driving wheel and the slip time of the right driving wheel both exceed a second slip time threshold, regulating the left driving wheel and the right driving wheel to brake.

The above-mentioned "first slip time threshold" refers to the shortest time during which the defined left or right driving wheel does not slip after the engine torque is reduced to the target regulation torque.

The "second slip time threshold" refers to the longest time during which the defined left and right driving wheels still slip after the engine torque is reduced to the target regulation torque.

The first slip time threshold is less than the second slip time threshold.

Generally, the uniform adhesion pavement does not require braking, and the slip of the driving wheel can be $$T_{EngTorqAdjust} = \begin{cases} 0.4 * T_{BasedEngTorq} & T_{EngTorqAdjust1} > 0.4 * T_{BasedEngTorq} \\ T_{EngTorqAdjust1} & -0.4 * T_{BasedEngTorq} \leq T_{EngTorqAdjust1} \leq 0.4 * T_{BasedEngTorq} \\ -0.4 * T_{BasedEngTorq} & T_{EngTorqAdjust1} < -0.4 * T_{BasedEngTorq} \end{cases}$$

S1303: Calculating a target regulation torque of the vehicle engine according to the based engine torque and the adjustment engine torque.

Optionally, the calculation formula of the target regulation torque of the engine is $$T_{EngTorqDemand} = T_{BasedEngTorq} + T_{EngTorqAdjust}$$

$T_{EngTorqDemand}$ is the target regulation torque of the engine, $T_{BasedEngTorq}$ is the based engine torque, and $T_{EngTorqAdjust}$ is the adjustment engine torque.

S1304: Performing vehicle slip regulation according to the target regulation torque.

With the continuous improvement of safety regulations and the continuous improvement of people's safety awareness, acceleration slip regulation is more and more applied to vehicles, and many vehicle acceleration slip regulation technologies are dominated by braking control and assisted by driving control. When the wheel slips greatly, a large braking strength is applied to suppress the slip of the wheel, so that the braking torque and the driving torque are couneliminated only by reducing the engine torque. There are two situations that require some braking.

During the use of the vehicle, driving wheels on left and right sides are not identical. By simply reducing the target regulation torque of the engine, the slip amount of the driving wheel on one side may be small, and the slip amount of the driving wheel on the other side may be large. At this time, certain breaking control is required for the driving wheel with a large slip amount. The breaking control is logic threshold control. When the slip amount and wheel acceleration are large, a pressure increase instruction is given. When the slip amount and wheel acceleration are medium, the pressure is maintained. When the slip amount and the acceleration are small, the pressure is reduced. By this method, the slip of the driving wheel on the side with a large slip amount can be quickly eliminated, thereby improving the power performance and lateral stability of the vehicle.

The other is simultaneous braking on both sides. The determination basis of this situation is that the slip of the driving wheel cannot be quickly suppressed only by the engine torque, and the determination condition is the deceleration when the wheel is decelerated. If the deceleration is too small, it takes a long time for the driving wheel to reach near the speed of the non-driving wheel, and the driving wheel is in the slip state for a long term, causing large traffic hazards. When the output torque of the engine is almost close to the minimum output torque, but since the driving force of the vehicle still exceeds the maximum driving force that the ground can provide under the adhesion, it is impossible to further reduce the target regulation torque of the engine, and the speed of the driving wheel can only be suppressed near the speed of the non-driving wheel by applying certain braking control. The control logic is the same as that of one-side driving wheel braking control under uniform adhesion conditions.

If the slip amounts of the wheels on both sides are very small in several cycles, the braking control for the uniform adhesion pavement is exited, the step of determining the pavement type at this time is returned, and the corresponding vehicle slip regulation is performed again according to the pavement type. If the braking control is not performed, braking is not required.

(b) If the pavement type is a bisectional adhesion pavement, the performing vehicle slip regulation according to the target regulation torque includes reducing the engine torque to the target regulation torque, and regulating the driving wheel on the low adhesion side to brake; If the driving wheel on the low adhesion side does not slip within a first time cycle, reducing the braking pressure; and If the driving wheel on the low adhesion side slips after the braking pressure is reduced, increasing the braking pressure of the driving wheel on the low adhesion side; Or if the driving wheel on the low adhesion side does not slip after the braking pressure is reduced, reducing the braking pressure of the driving wheel on the low adhesion side again.

For the bisectional pavement, the maximum driving force that the pavement on the low adhesion side can provide is much smaller than that on the high adhesion side. In order to fully use the adhesion on the high adhesion side, certain active braking needs to be applied on the low adhesion side to increase driving load and improve the output torque of the engine, so as to fully use the adhesion to the pavement on the high adhesion side, while the driving wheel on the low adhesion side is maintained within a stable range.

After the bisectional pavement is determined, a pressure increase instruction is determined according to the slip amount and acceleration of the driving wheel on the low adhesion side, so that the braking pressure reaches a certain value. The pressure is maintained after the slip of the wheel on the low adhesion side is suppressed. When the driving wheel on the low adhesion side does not slip within a certain cycle time, a minimum cyclic pressure reduction instruction is provided to reduce the pressure slightly, so as to prevent the counteraction of the driving torque and the braking torque. Feedback is performed according to the slip amount on the low adhesion side. If the driving wheel on the low adhesion side still does not slip after the braking pressure is reduced, the pressure reduction instruction within a certain cycle time is repeated. If the driving wheel on the low adhesion side slips after the braking pressure is reduced, a minimum cyclic pressure increase instruction is provided to suppress the slip of the driving wheel on the low adhesion side.

If the driving wheel on the low adhesion side never slips within a period of time after multiple pressure reduction and pressure maintaining cycles, the braking pressure control on the low adhesion side of the bisectional pavement is exited. After the braking control is exited, the step of determining the pavement type at this time is returned, and the corresponding vehicle slip regulation is performed again according to the pavement type. If the braking control is not performed, braking is not required.

Optionally, after the vehicle slip regulation is performed, the method further includes the step of exiting the acceleration slip regulation.

The acceleration slip regulation is exited when there is no braking and the target regulation torque of the engine is equal to the driver's desired torque for a period of time, or when the driver depressing the brake pedal is sensed, or when the speed of the vehicle is too high.

Figure 4:
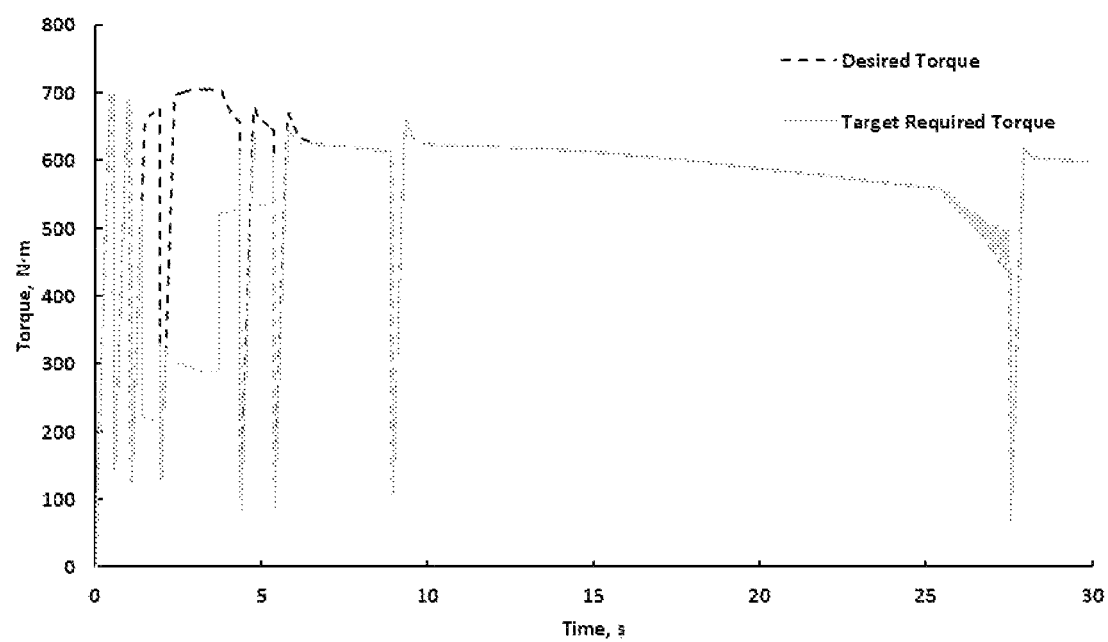
FIG. 4 is a schematic illustration of a desired torque and a target required torque under the uniform adhesion pavement.
Figure 5:
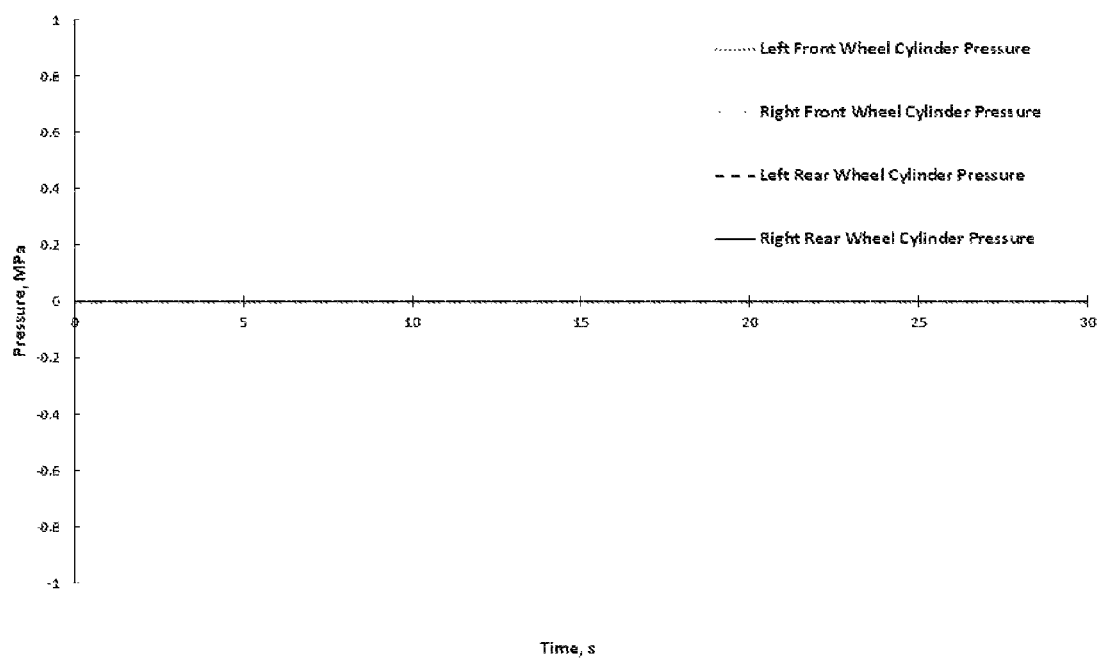
FIG. 5 is a schematic illustration of pressure of each wheel cylinder under the uniform adhesion pavement.
Figure 6:
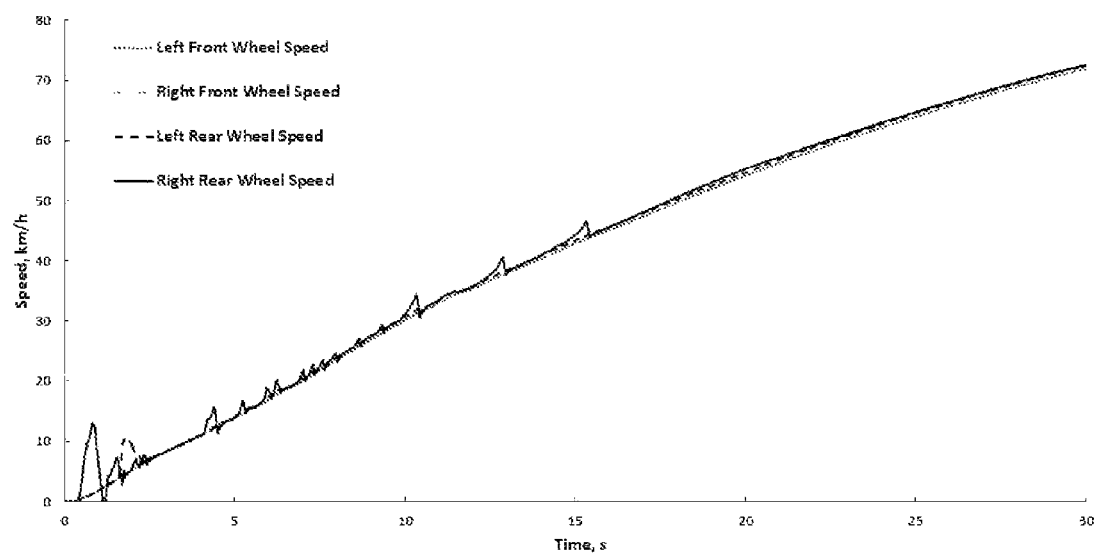
FIG. 6 is a schematic illustration of speeds of wheels under a bisectional pavement.
Figure 7:
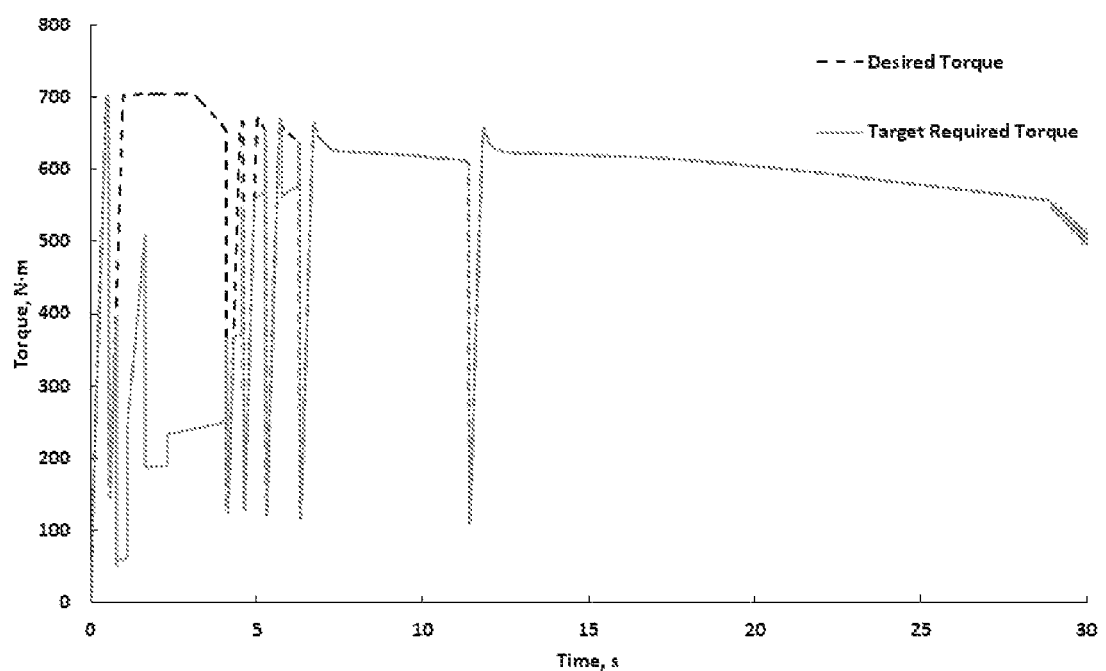
FIG. 7 is a schematic illustration of a desired torque and a target required torque under the bisectional pavement.
Figure 8:
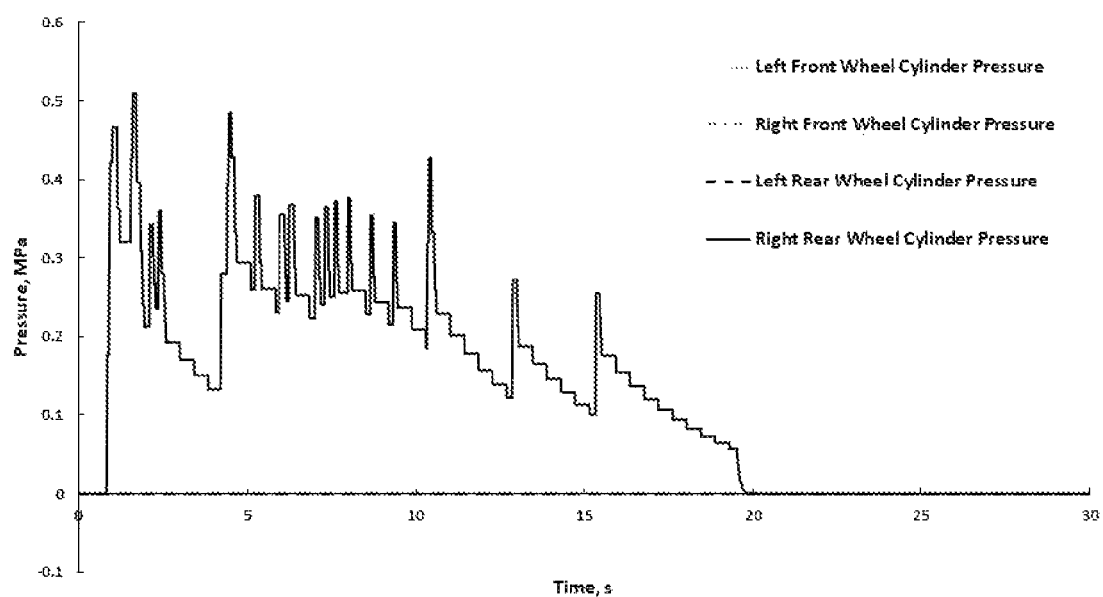
FIG. 8 is a schematic illustration of pressure of each wheel cylinder under the bisectional pavement.

FIG. 3 to FIG. 8 sequentially show the wheel cylinder pressure, speed, torque, etc. when the vehicle slip regulation method provided by the embodiment of the present invention performs regulation under the uniform adhesion pavement and the bisectional adhesion pavement. The desired torque in FIGS. 4 and 8 is the driver's desired torque, and the target required torque is the target regulation torque of the engine.

It should be noted that the vehicle in this embodiment includes, but is not limited to, commercial vehicles and/or passenger vehicles.

Figure 9:
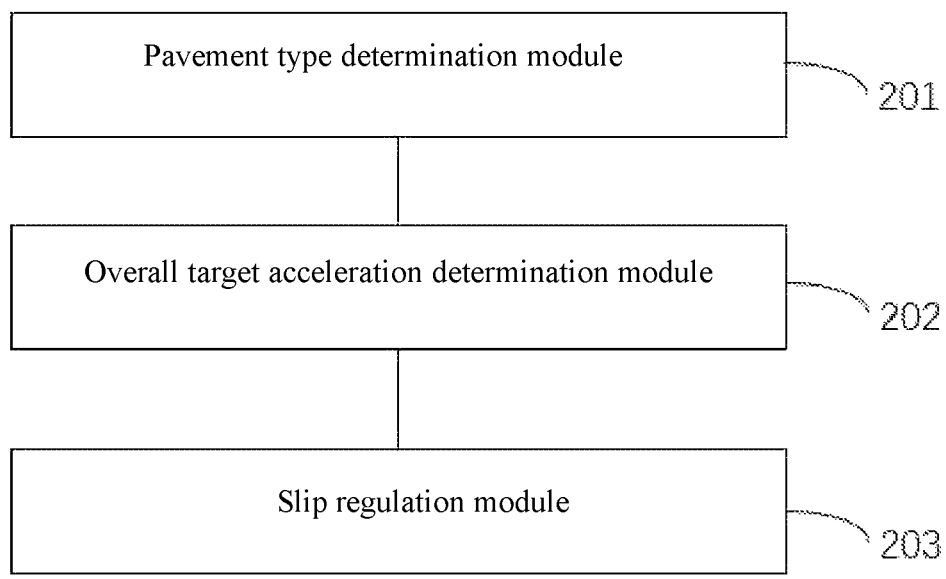
FIG. 9 is a schematic structural illustration of a vehicle slip regulation apparatus provided by an embodiment of the present invention.

As shown in FIG. 9, an embodiment of the present invention further provides a vehicle slip regulation apparatus, including:

A pavement type determination module 201, configured to determine a pavement type of a vehicle driving pavement in response to a vehicle acceleration slip regulation event.

Preferably, the pavement type determination module 201 includes:

a vehicle left driving wheel slip amount calculation unit, configured to calculate the slip amount S1 of a left driving wheel according to the speed of the left driving wheel and the speed of a non-driving wheel;

a vehicle right driving wheel slip amount calculation unit, configured to calculate the slip amount S2 of a right driving wheel according to the speed of the right driving wheel and the speed of the non-driving wheel; and a determination unit, configured to determine the pavement type according to the magnitudes of S1 and S2; when the difference between S1 and S2 is greater than a first value, S1>S2 and S2 is less than a second value, determining that the pavement is a bisectional adhesion pavement having low adhesion on a left driving wheel side or a bisectional adhesion pavement having high adhesion on a right driving wheel side; When the difference between S2 and S1 is greater than the first value, S2>S1 and S1 is less than the second value, determining that the pavement is a bisectional adhesion pavement having low adhesion on the left driving wheel side or a bisectional adhesion pavement having high adhesion on the right driving wheel side; Or when the absolute value of the difference between S1 and S2 is less than or equal to the first value, determining that the pavement is a uniform adhesion pavement. The first value is greater than the second value.

An overall target acceleration determination module 202, configured to determine an overall target acceleration of a vehicle according to the determined pavement type, the speed of the non-driving wheel and the slip time of the driving wheel. If the pavement type is a uniform adhesion pavement, the overall target acceleration under the uniform adhesion pavement is determined according to the speed of the non-driving wheel and the slip time of the driving wheel; If the pavement type is a bisectional adhesion pavement, the overall target acceleration under the bisectional adhesion pavement is determined according to the speed of the non-driving wheel, the slip time of the driving wheel on the high adhesion side, and the slip time of the driving wheel on the low adhesion side. The driving wheel on the low adhesion side and the driving wheel on the high adhesion side are determined according to the slip amounts of driving wheels on different sides.

Preferably, the overall target acceleration determination module 202 includes:

an overall target acceleration determination unit under a uniform adhesion pavement, configured to determine the overall target acceleration under the uniform adhesion pavement according to the speed of the non-driving wheel and the slip time of the driving wheel; and an overall target acceleration determination unit under a bisectional adhesion pavement, configured to determine the overall target acceleration under the bisectional adhesion pavement according to the speed of the non-driving wheel, the slip time of the driving wheel on the high adhesion side and the slip time of the driving wheel on the low adhesion side.

The driving wheel on the low adhesion side and the driving wheel on the high adhesion side are determined according to the slip amounts of driving wheels on different sides.

Preferably, the overall target acceleration determination unit under the bisectional adhesion pavement includes:

a non-driving wheel speed acceleration determination unit when the driving wheel on the high adhesion side is slipping, configured to determine, according to the speed of the non-driving wheel and the slip time of the driving wheel on the high adhesion side, an acceleration of the wheel speed of the non-driving wheel when the driving wheel on the high adhesion side is slipping;

a non-driving wheel speed acceleration determination unit when the driving wheel on the low adhesion side is slipping, configured to determine, according to the speed of the non-driving wheel and the slip time of the driving wheel on the low adhesion side, an acceleration of the wheel speed of the non-driving wheel when the driving wheel on the low adhesion side is slipping; and an overall target acceleration determination unit, configured to calculate double difference between the acceleration of the wheel speed of the non-driving wheel when the driving wheel on the high adhesion side is slipping and the acceleration of the wheel speed of the non-driving wheel when the driving wheel on the low adhesion side is slipping, to obtain the overall target acceleration under the bisectional adhesion pavement.

A slip regulation module 203, configured to perform vehicle slip regulation according to the overall target acceleration.

Preferably, the slip regulation module 203 includes:

a based engine torque calculation unit, configured to calculate a based engine torque according to the overall target acceleration;

an adjustment engine torque calculation unit, configured to calculate an adjustment engine torque according to the based engine torque;

a target regulation torque calculation unit, configured to calculate a target regulation torque of a vehicle engine according to the based engine torque and the adjustment engine torque; and a regulation unit, configured to perform vehicle slip regulation according to the target regulation torque.

The regulation methods of the regulation unit include:

If the pavement type is a uniform adhesion pavement, reducing the engine torque to the target regulation torque, and determining whether the left driving wheel and the right driving wheel slip after the time difference between the start time of reducing the engine torque and the current time exceeds a first slip time threshold; If the left driving wheel and the right driving wheel do not slip, regulating the engine to maintain the target regulation torque; If the left driving wheel slips, the right driving wheel does not slip and the slip amount of the left driving wheel exceeds a first slip amount threshold, regulating the left driving wheel to brake; If the right driving wheel slips, the left driving wheel does not slip and the slip amount of the right driving wheel exceeds the first slip amount threshold, regulating the right driving wheel to brake; Or if the slip time of the left driving wheel and the slip time of the right driving wheel both exceed a second slip time threshold, regulating the left driving wheel and the right driving wheel to brake;

If the pavement type is a bisectional adhesion pavement, reducing the engine torque to the target regulation torque, to regulate the driving wheel on the low adhesion side to brake; If the driving wheel on the low adhesion side does not slip within a first time cycle, reducing the braking pressure; If the driving wheel on the low adhesion side slips after the braking pressure is reduced, increasing the braking pressure of the driving wheel on the low adhesion side; Or if the driving wheel on the low adhesion side does not slip after the braking pressure is reduced, reducing the braking pressure of the driving wheel on the low adhesion side again.

The above-mentioned vehicle slip regulation apparatus is used to execute the vehicle slip regulation method in the embodiments of the present invention, and at least has modules and beneficial effects corresponding to the above-mentioned vehicle slip regulation method.

Figure 10:
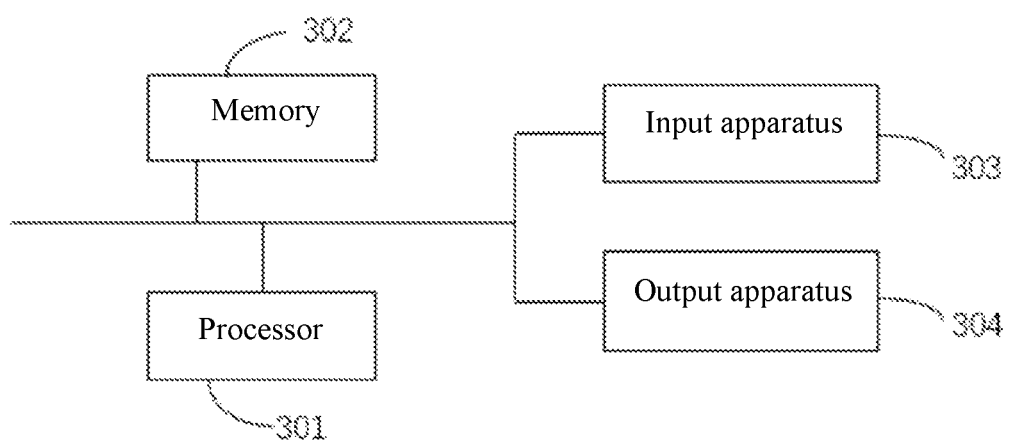
FIG. 10 is a schematic structural illustration of an electronic device provided by an embodiment of the present invention.

FIG. 10 shows an electronic device provided by an embodiment of the present invention, including:

at least one processor; and a memory connected to the at least one processor by communication.

The memory stores instructions executable by the at least one processor, and the instructions are executed by the at least one processor, so that the at least one processor can execute the aforementioned vehicle slip regulation method.

The processor in the electronic device can execute the above-mentioned vehicle slip regulation method, and thus has at least the same advantages as the method.

Optionally, the electronic device further includes interfaces for connecting various components, including high-speed interfaces and low-speed interfaces. The various components are interconnected by different buses and may be installed on a common motherboard or installed otherwise as required. The processor may process instructions executed within the electronic device, including instructions stored in or on a memory to display graphical information of GUI on an external input/output apparatus (e.g., a display device coupled to the interface). In other embodiments, a plurality of processors and/or a plurality of buses may be used with a plurality of memories and a plurality of memories, if necessary. Likewise, a plurality of electronic devices may be connected, each providing some necessary operations (e.g., as a server array, a group of blade servers, or a multiprocessor system). In FIG. 10, one processor 301 is used as an example.

As a computer-readable storage medium, the memory 302 may be used to store software programs, computer-executable programs and modules, such as program instructions/ modules corresponding to the vehicle slip regulation method in the embodiments of the present invention (e.g., the pavement type determination module 201, the overall target acceleration determination module 202 and the slip regulation module 203 in the vehicle slip regulation method). The processor 301 executes various functional applications and data processing of the device by running the software programs, instructions and modules stored in the memory 302, that is, implements the above-mentioned vehicle slip regulation method.

The memory 302 may mainly include a storage program region and a storage data region. The storage program region may store an operating system, and an application program required for at least one function; The storage data region may store data created according to the use of a terminal, etc. In addition, the memory 302 may include a high-speed random-access memory, and may also include a non-volatile memory, such as at least one magnetic disk storage device, a flash memory, or other non-volatile solid-state storage devices. In some examples, the memory 302 may further include memories arranged remotely from the processor 301, and these remote memories may be connected to the device through a network. Examples of the network include, but are not limited to, the Internet, an intranet, a local area network, a mobile communications network, or a combination thereof.

The electronic device may further include an input apparatus 303 and an output apparatus 304. The processor 301, the memory 302, the input apparatus 303, and the output apparatus 304 may be connected by a bus or other means, exemplified by a bus in FIG. 10.

The input apparatus 303 may receive input digital or character information, and the output apparatus 304 may include a display device, an auxiliary lighting apparatus (e.g., LED) and a tactile feedback apparatus (e.g., a vibration motor). The display device may include, but is not limited to, a liquid crystal display (LCD), a light emitting diode (LED) display, and a plasma display. In some implementations, the display device may be a touch screen.

An embodiment of the present invention further provides a medium, the medium stores computer instructions, and the computer instructions are used to cause a computer to execute the foregoing vehicle slip regulation method. The computer instructions in the medium are used to cause the computer to execute the above-mentioned vehicle slip regulation method, and thus have at least the same advantages as the vehicle slip regulation method.

The medium in the present invention may be one or a combination of computer-readable mediums. The medium may be a computer-readable signal medium or a computer-readable storage medium. The medium may be, for example, but not limited to, an electrical, magnetic, optical, electromagnetic, infrared, or semiconductor system, apparatus or device, or any combination of the above. More specific examples (non-exhaustive list) of the medium include: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. Here, the medium may be any tangible medium containing or storing programs which may be used by or in combination with an instruction execution system, apparatus or device.

The computer-readable signal medium may include data signals in a baseband or propagated as part of carriers, in which computer-readable program codes are carried. The propagated data signals may be in multiple forms, including but not limited to electromagnetic signals, optical signals or any suitable combination thereof. The computer-readable signal medium may also be any computer-readable medium beyond the computer-readable storage medium. The computer-readable medium is capable of sending, propagating or transmitting a program used by or in combination with an instruction execution system, apparatus or device.

The program codes included in the computer-readable medium may be transmitted by any appropriate medium, including but not limited to wireless, wire, optical cable, RF, etc., or any appropriate combination thereof.

Computer program codes for executing operations in the present invention may be compiled in one or more programming languages or a combination thereof. The programming languages include object-oriented programming languages, such as Java, Smalltalk or C++, and further include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including a local area network (LAN) or a wide area network (WAN), or may be connected to an external computer (for example, connected through Internet using an Internet service provider).

It should be understood that steps may be reordered, added, or deleted using the various forms of flow shown above. For example, the steps described in the present application may be performed in parallel, sequentially or in different orders. As long as the desired results of the technical solutions disclosed in the present application can be achieved, no limitation is imposed herein.

The above specific embodiments do not constitute the restriction to the protection scope of the present application. It should be understood by those skilled in the art that various modifications, combinations, sub-combinations and substitutions may be performed according to design requirements and other factors. Any modifications, equivalent replacements and improvements made within the spirit and principles of the present application shall fall within the protection scope of the present application.

What is claimed is:

1. A vehicle slip regulation method, comprising the following steps:
    determining a pavement type of a vehicle driving pavement in response to a vehicle acceleration slip regulation event;
    determining an overall target acceleration of a vehicle according to the determined pavement type, a speed of a non-driving wheel and a slip time of a driving wheel; and
    performing vehicle slip regulation according to the overall target acceleration;
    wherein the performing vehicle slip regulation according to the overall target acceleration comprises:
    calculating a based engine torque according to the overall target acceleration;
    calculating an adjustment engine torque according to the based engine torque;

calculating a target regulation torque of a vehicle engine according to the based engine torque and the adjustment engine torque; and performing vehicle slip regulation according to the target regulation torque;

wherein the determining the overall target acceleration of the vehicle according to the determined pavement type, the speed of the non-driving wheel and the slip time of the driving wheel comprises:

if the pavement type is a uniform adhesion pavement, determining the overall target acceleration under the uniform adhesion pavement according to the speed of the non-driving wheel and the slip time of the driving wheel; or if the pavement type is a bisectional adhesion pavement, determining the overall target acceleration under the bisectional adhesion pavement according to the speed of the non-driving wheel, the slip time of the driving wheel on a high adhesion side, and the slip time of the driving wheel on a low adhesion side;

wherein the driving wheel on the low adhesion side and the driving wheel on the high adhesion side are determined according to slip amounts of driving wheels on different sides; a slip amount of driving wheel refers to a distance of slip of driving wheel when the vehicle slips.

2. The vehicle slip regulation method according to claim 1, wherein the determining the overall target acceleration under the bisectional adhesion pavement according to the speed of the non-driving wheel, the slip time of the driving wheel on a high adhesion side and the slip time of the driving wheel on a low adhesion side comprises:

determining, according to the speed of the non-driving wheel and the slip time of the driving wheel on the high adhesion side, a first acceleration of the non-driving wheel of the vehicle when the driving wheel on the high adhesion side is slipping;

determining, according to the speed of the non-driving wheel and the slip time of the driving wheel on the low adhesion side, a second acceleration of the non-driving wheel of the vehicle when the driving wheel on the low adhesion side is slipping;

calculating double difference between the first acceleration and the second acceleration, to obtain the overall target acceleration under the bisectional adhesion pavement.

3. The vehicle slip regulation method according to claim 1, wherein the calculating the based engine torque according to the overall target acceleration comprises:

determining the based engine torque according to a vehicle weight, overall target acceleration, transmission ratio, final drive ratio, and powertrain mechanical efficiency.

4. The vehicle slip regulation method according to claim 3, wherein the based engine torque is determined according to following formula:

$T_{BasedEngTorq} = (ma_t \times r)/(i_g \times i_0 \times \eta)$; $T_{BasedEngTorq}$ is the based engine torque, m is the vehicle weight, $a_t$ is the overall target acceleration, r is a radius of the driving wheel, $i_g$ is the transmission ratio, $i_0$ is the final drive ratio, and $\eta$ is the powertrain mechanical efficiency.

5. The vehicle slip regulation method according to claim 1, wherein the calculating the adjustment engine torque according to the based engine torque comprises:

calculating an initial adjustment engine torque according to an initial adjustment engine torque increase; wherein the initial adjustment engine torque increase refers to an initial adjustment value for adjusting the increase in the based engine torque, and the initial adjustment engine torque refers to an initial adjustment value for adjusting the deviation of the based engine torque;

if the initial adjustment engine torque is greater than a first proportion of the based engine torque, determining that the adjustment engine torque is the first proportion of the based engine torque;

if the initial adjustment engine torque is between a second proportion of the based engine torque and the first proportion of based engine torque, determining that the adjustment engine torque is the initial adjustment engine torque; or if the initial adjustment engine torque is less than the second proportion of the based engine torque, determining that the adjustment engine torque is the second proportion of the based engine torque.

6. The vehicle slip regulation method according to claim 1, wherein if the pavement type is the uniform adhesion pavement and the vehicle comprises a left driving wheel and a right driving wheel, the performing vehicle slip regulation according to the target regulation torque comprises:

reducing the engine torque to the target regulation torque, and determining whether the left driving wheel slips and whether the right driving wheel slips after the time difference between the start time of reducing the engine torque and the current time exceeds a first slip time threshold;

if the left driving wheel does not slip and the right driving wheel also does not slip, regulating the engine to maintain the target regulation torque;

if the left driving wheel slips, the right driving wheel does not slip and the slip amount of the left driving wheel exceeds a first slip amount threshold, regulating the left driving wheel to brake; the slip amount of the left driving wheel refers to the distance of slip of the left driving wheel when the vehicle slips;

if the right driving wheel slips, the left driving wheel does not slip and the slip amount of the right driving wheel exceeds the first slip amount threshold, regulating the right driving wheel to brake; the slip amount of the right driving wheel refers to the distance of slip of the right driving wheel when the vehicle slips; or if the slip time of the left driving wheel and the slip time of the right driving wheel both exceed a second slip time threshold, regulating the left driving wheel and the right driving wheel to brake.

7. The vehicle slip regulation method according to claim 1, wherein if the pavement type is the bisectional adhesion pavement, the performing vehicle slip regulation according to the target regulation torque comprises:

reducing the engine torque to the target regulation torque, to regulate the driving wheel on the low adhesion side to brake; if the driving wheel on the low adhesion side does not slip within a first time cycle, reducing the braking pressure of the driving wheel on the low adhesion side;

if the driving wheel on the low adhesion side slips after the braking pressure is reduced, increasing the braking pressure of the driving wheel on the low adhesion side; or if the driving wheel on the low adhesion side does not slip after the braking pressure is reduced, reducing the braking pressure of the driving wheel on the low adhesion side again.

8. The vehicle slip regulation method according to claim 1, wherein if the vehicle comprises a left driving wheel and a right driving wheel, the determining the pavement type of the vehicle driving pavement comprises:
- if the difference between S1 and S2 is greater than a first value, S1>S2 and S2 is less than a second value, determining that the pavement type is a bisectional adhesion pavement having low adhesion on the left driving wheel side or a bisectional adhesion pavement having high adhesion on the right driving wheel side;
- if the difference between S2 and S1 is greater than the first value, S2>S1 and S1 is less than the second value, determining that the pavement type is a bisectional adhesion pavement having low adhesion on the right driving wheel side or a bisectional adhesion pavement having high adhesion on the left driving wheel side;
- if the absolute value of the difference between S1 and S2 is less than or equal to the first value, determining that the pavement type is a uniform adhesion pavement;
- wherein S1 is the slip amount of the left driving wheel, S2 is the slip amount of the right driving wheel, and the first value is greater than the second value;
- the slip amount of the left driving wheel refers to the distance of slip of the left driving wheel when the vehicle slips; the slip amount of the right driving wheel refers to the distance of slip of the right driving wheel when the vehicle slips.

9. The vehicle slip regulation method according to claim 8, wherein the slip amount of the left driving wheel is obtained in the following way:
- calculating the difference between the speed of the left driving wheel and the speed of the non-driving wheel;
- determining an accumulated slip amount of the left driving wheel of the vehicle according to the calculated difference and a target time to be determined; taking the accumulated slip amount as the slip amount of the left driving wheel; the accumulated slip amount of the left driving wheel refers to an accumulated value of the slip amount of the left driving wheel within a certain time.

10. A vehicle slip regulation apparatus built in a system including a processor and a memory in connection with the processor, the vehicle slip regulation apparatus comprising:
- a pavement type determination module, which is stored in the memory and is configured to execute in the processor to determine a pavement type of a vehicle driving pavement in response to a vehicle acceleration slip regulation event;
- an overall target acceleration determination module, which is stored in the memory and is configured to execute in the processor to determine an overall target acceleration of a vehicle according to the determined pavement type, a speed of a non-driving wheel and a slip time of a driving wheel; if the pavement type is a uniform adhesion pavement, determining the overall target acceleration under the uniform adhesion pavement according to the speed of the non-driving wheel and the slip time of the driving wheel; if the pavement type is a bisectional adhesion pavement, determining the overall target acceleration under the bisectional adhesion pavement according to the speed of the non-driving wheel, the slip time of the driving wheel on a high adhesion side and the slip time of the driving wheel on a low adhesion side, wherein the driving wheel on the low adhesion side and the driving wheel on the high adhesion side are determined according to the slip amounts of driving wheels on different sides; and
- a slip regulation module, which is stored in the memory and is configured to execute in the processor to perform vehicle slip regulation according to the overall target acceleration.

11. An electronic device, comprising:
- at least one processor; and
- a memory connected to the at least one processor by communication, wherein
- the memory stores instructions executable by the at least one processor, and the instructions are executed by the at least one processor, so that the at least one processor can execute the vehicle slip regulation method according to claim 1.

12. A medium, wherein the medium stores computer instructions, and the computer instructions are used to cause a computer to execute the vehicle slip regulation method according to claim 1.

* * * * *